Patented Mar. 25, 1947

2,417,806

UNITED STATES PATENT OFFICE 2,417,806

INHIBITION OR RETARDATION OF THE GROWTH OF MICRO-ORGANISMS IN MEAT

Hans F. Bauer and Elmer F. Glabe, Chicago, Ill., assignors, by mesne assignments, to Stein, Hall & Co., Inc., a corporation of New York No Drawing. Application July 24, 1940, Serial No. 347,156

14 Claims. (Cl. 99—157)

This invention relates to a process and a new and improved type of composition for the prevention of the growth and development of microorganisms, more particularly those sub-groups of the thallophytes (simple undifferentiated plants) known commonly as the molds and schizomycetes or bacteria. In its more specific aspects, the invention relates to the preparation of meat products whereby the keeping and other qualities of such products may be enhanced.

The present application is a continuation-in-part of our co-pending application Serial No. 278,588, filed June 12, 1939, which is directed generally toward the inhibition of the development and growth of micro-organisms of the type described, and in one of its more specific aspects, toward the inhibition of the growth and development of such organisms in bread and other bakery products.

One of the general objects of the present application is to cover the new and improved method for retarding or inhibiting the growth of such micro-organisms in widely different types of materials.

Another object is to provide a new and improved process for controlling the growth of bacteria generally.

Still another object of the invention is to provide a new and improved type of bactericidal composition.

Another object of the invention is to provide a new and improved process for the retardation or inhibition of mold.

Still another object of the invention is to provide a new and improved type of mold inhibiting or retarding composition.

A more specific object of the invention is to provide a method and composition for the retardation or inhibition of the growth of bacteria and mold in meat products. Other objects of the invention will appear hereinafter.

In accordance with this invention it has been found that a particular class or type of agent heretofore unconsidered in the art, namely, an acetate containing combined but undissociated acetic acid in its molecule, and preferably sodium diacetate having the formula:

2(CH$_3$COONa).2(CH$_3$COOH).H$_2$O has the property of retarding, inhibiting and preventing the growth and development of micro-organisms such as bacteria and mold in foodstuffs, beverages and other substances. The present invention, therefore, provides a new and improved method in which the simple addition of a single ingredient as an auxiliary agent or the addition of a composition containing such ingredient will enhance the keeping, and in some cases, the other qualities of foodstuffs, beverages and other substances. In some cases it has been found that said single ingredient not only exercises an independent action of its own, but also a cooperative action with the other ingredients present.

Tests which have been made, as more fully hereinafter described, clearly demonstrate that the addition of the above mentioned ingredient will retard, inhibit or prevent the growth of bacteria of widely different varieties, including among others micro-organisms of the *Bacillus mesentericus* group, for example, *Bacillus mesentericus* Vulgatus, which are those encapsulated organisms causing ropiness in bread, and slimes in or on other food products. Other tests have shown, as more fully described hereinafter, that said ingredient will retard, inhibit or prevent the growth of mold in foodstuffs and other substances. It has also been found, as more fully explained and claimed in our co-pending application, that said complex acetate salts have, in addition to the property of inhibiting the growth of micro-organisms such as rope and mold, certain other beneficial effects in making foodstuffs such as bread. Although the present invention is directed toward some general phases of the invention, in its more specific aspects it is directed toward the manufacture of meat products.

As is well known, meat products generally are subject to the growth of micro-organisms such as bacteria and mold. It has been found in the practice of this invention that the treatment with, or the incorporation into meat products of complex acetate salts of the type previously mentioned will retard, inhibit or prevent the growth of bacteria and other micro-organisms such as mold.

One of the features of the invention is the provision of a new and improved type of micro-organism inhibiting composition comprising a complex acetate salt of the type previously described, preferably sodium diacetate. A meat product may be treated with this composition by spraying the composition onto the meat product, by dipping the meat product into the composition, or by incorporating the composition into the meat product. The composition may be prepared in the following forms: (a) In dry form, comprising an adhesive base or a potentially adhesive base, and a complex acetate salt of the type mentioned, preferably sodium diacetate; (b) In liquid form, comprising a liquid carrier medium, a colloidal or gelatinous adhesive material, and a complex acetate salt of the type mentioned, preferably sodium diacetate; (c) A composition either liquid or solid, comprising a binder such as is ordinarily incorporated into meat products, together with a complex acetate salt of the character described, preferably sodium diacetate. The complex acetate salt may also be added directly to the meat product. However, where the meat product is merely subjected to an external treatment, as, for example, in the treatment of sausages, by immersing them in a composition of the type herein described, it is preferable for the best results to employ a treating composition containing not only the complex acetate salt, but an adhesive suspending medium therefor of a type suitable for adhering to the sausage casing or other product treated.

The following compositions are typical:

FORMULA A

15% to 85% complex acetate salt, for example, sodium diacetate, 85% to 15% of a dry adhesive base, for example, agar agar, gelatin, starches, dextrines, starch gums, locust bean gum or other edible adhesive materials.

FORMULA B

The composition in this case is the same as in Formula A with the addition of water or other suitable liquid carrier medium, the amount of which will depend upon the particular type of adhesive base material. Thus, if a dextrine is employed, the amount of water may vary from about 1 to about 8 parts per part of dextrine. If a British gum is used, the amount of water may vary from about 1 to 12 parts per part of British gum. If a pre-gelatinized starch is employed, the amount of water may vary from about 1 to 30 parts per part of starch. If a raw starch is employed, the amount of water may vary from about 1 to 30 parts per part of raw starch. If gelatin is used, the amount of water may vary from about 1 to 11 parts per part of gelatin. If agar agar is used, the amount of water may vary from about 1 to 75 parts per part of agar agar. If locust bean gum is employed, the amount of water may vary from about 1 to 50 parts per part of locust bean gum. It will be recognized that the amount of water may be increased or decreased, depending upon the desired viscosity of the composition. The type of adhesive base chosen will also vary depending upon the particular type of casing, or other material covering the meat product. Any edible gum or adhesive base material may be used.

FORMULA C

1% to 35% of complex acetate salt, preferably sodium diacetate.

99% to 65% of a meat binder which may be, for example, a cereal binder, a starchy vegetable flour or powdered milk.

The invention will be illustrated but is not limited by the following examples, in which the quantities are stated in parts by weight unless otherwise indicated:

EXAMPLE I

The general bactericidal properties of sodium diacetate were determined on agar plates adjusted to a pH of 7.00. All plates were inoculated with 1 cc. of a physiological salt solution containing a large number of bacteria of different varieties. The sodium diacetate solutions were prepared from sterile water in the following concentrations:

Table I

No. 1—50 grams sodium diacetate per 100 cc. water

No. 2—10 grams sodium diacetate per 100 cc. water

No. 3—5 grams sodium diacetate per 100 cc. water

No. 4—.1 gram sodium diacetate per 100 cc. water

No. 5—.05 gram sodium diacetate per 100 cc. water

No. 6—.01 gram sodium diacetate per 100 cc. water

Duplicate plates using 1 cc. of each of these solutions were made. The total weight of the medium, inoculum and sodium diacetate solution amounted to about 14 grams. The plates were incubated at 37.5° C. The results were as follows:

Table II

COLONIES

| Control | 24 Hrs. 3,000 | 48 Hrs. 6,000 | 72 Hrs. 6,000 | Per cent Sodium Diacetate Based on 14 g. Medium |
|---|---|---|---|---|
| 1 cc. soln. #1 | 0 | 0 | 0 | 3.5 |
| 1 cc. soln. #2 | 0 | 0 | 0 | 0.7 |
| 1 cc. soln. #3 | 0 | 0 | 0 | .35 |
| 1 cc. soln. #4 | 0 | 600 | 600 | .07 |
| 1 cc. soln. #5 | 0 | 800 | 1,000 | .035 |
| 1 cc. soln. #6 | 0 | 3,000 | 4,000 | .007 |

From the foregoing table it will be observed that even very small amounts of sodium diacetate had a retarding effect on the development of the bacteria colonies. This retarding effect was very pronounced with as little as .07% of sodium diacetate and complete inhibition was obtained over a period of 72 hours with .35% sodium diacetate.

EXAMPLE II

The mold inhibition properties of sodium diacetate were determined first on prune agar plates adjusted to a pH of 4.0. This pH level successfully stopped all bacterial growth but allowed for good mold development. Duplicate plates using 1 cc. of the sodium diacetate solutions prepared as in Example I were made. Each plate was then inoculated by touching the medium surface at three places with a needle previously infected with mold of the Aspergillas and related types. These are common bread molds. The results were as follows:

Table III

MOLD GROWTH

| | 24 Hrs. VL | 48 Hrs. VL | 72 Hrs. VL | Per cent Sodium Diacetate 0 |
|---|---|---|---|---|
| 1 cc. soln. #1 | 0 | 0 | 0 | 3.5 |
| 1 cc. soln. #2 | 0 | 0 | 0 | 0.7 |
| 1 cc. soln. #3 | 0 | 0 | 0 | .35 |
| 1 cc. soln. #4 | F | L | L | .07 |
| 1 cc. soln. #5 | FL | VL | VL | .035 |
| 1 cc. soln. #6 | L | VL | VL | .007 |

L—Luxuriant growth.
F—Fair growth.
S—Slight growth.
0—No.
V—Very.

The following is an example of the application of this invention to the treatment of meat products, more particularly sausages:

EXAMPLE III

A mixture was prepared consisting of 300 parts of locust bean gum and 2700 parts of sodium diacetate. This mixture was added to water in proportions corresponding to 1 part of the mixture to 20 parts of water. A homogeneous dispersion was made by raising the temperature of the water mixture up to 165° F. to 170° F. and then cooling.

A series of natural casing sausages were dipped into this mixture and then hung in a refrigerator at a temperature of about 40° F., together with a series of control samples which were undipped. The dipped samples and the control samples were examined from day to day. In seven days mold appeared on the control samples but no mold at all appeared on the dipped samples until twelve days and then just a few light spots of mold appeared, while at this time the control samples were white with mold.

The foregoing example is given as an example of the application of this invention to the outside or casing of meat products. Similarly, it may be applied to other types of casings, as, for example, sausages having a cellulose casing. Instead of the locust bean gum of the example, other gums or adhesive colloidal materials of an edible nature may be employed to hold the sodium diacetate in contact with the casing. The application of the mold inhibiting composition is not limited to dipping. It may be applied by spraying or in any other suitable manner.

Instead of applying the mold inhibiting composition to the outside or casing of the meat product, it may be incorporated directly therein. This is preferably accomplished by mixing the sodium diacetate with the binders normally incorporated with the meat products in the manner already indicated. Ordinary meat products may contain up to about 3½% of a cereal binder, a starchy vegetable flour or powdered milk. The amount of sodium diacetate incorporated with the binder may vary rather widely, preferably being within the range of 1% to 35% based on the weight of the binder, or a total percentage of sodium diacetate based on the meat product within the range from about .1% to about 1.5%. It will readily be recognized that the sodium diacetate per se may be incorporated directly with the meat product without first adding it to the binder.

Many types of meat products are surrounded with gelatin or other solidifiable material of a similar type and placed in casings. Hams and chickens, for example, are often put up in this way. In accordance with the present invention the sodium diacetate may be incorporated into the gelatin or other medium surrounding the meat product to thereby inhibit mold in the surrounding medium. In this way, hams, chickens and other meat products may be prepared surrounded by a solidifying agent such as gelatin or the like, containing sodium diacetate as a mold inhibiting agent. The invention is also applicable to the treatment of meats of all types, including beef, regardless of whether a casing is employed to surround the meat product, or whether any additional agent such as a solidifying agent is employed to fill in the interstices between the meat product and the casing.

While the invention has been described specifically with reference to sodium diacetate because this is practically the only salt of this type available commercially today, it is also applicable to the other acetate salts of a similar nature. A number of sodium acetate-acetic acid-water systems are known to exist as mentioned by Beilstein, 4th edition, vol. II, page 107. Solid salts containing combined but undissociated acetic acid can be prepared containing from, say, 20% to 40% available undissociated acid, but an acid sodium salt of acetic acid containing from about 25% to about 35% of available acetic acid is preferred for the purpose of this invention. The sodium diacetate now available commercially is said to contain 33% to 35% available acetic acid with a pH in 10% solution within the range of 4 to 5.5.

As will be understood from the general nature of the invention and by reference to our copending application, previously referred to, the invention is not limited to the treatment of meat products but may be employed in protecting other materials susceptible to the growth and development of bacteria or molds such as fruits, paper, textiles, wood, vegetables, leather, milk, beer, butter, cheese, pickles, kraut, jellies and foodstuffs of all kinds, as well as adhesives and materials containing adhesives, for example, those made from starches, proteins and the like, with or without auxiliary materials. Sodium diacetate may be incorporated directly into the foodstuff or other material and distributed throughout said foodstuff or said other material either before or after processing, or it may be applied to the surface of a foodstuff, paper or other material in any suitable manner, for instance, by spraying a solution of diacetate thereon. The amount and concentration of sodium diacetate will depend upon the particular material being treated and may naturally be much greater with some materials than with others. In its broader aspects the invention contemplates the use of other acetate salts containing combined but undissociated acetic acid, more particularly non-toxic soluble complex salts, for instance, the alkali metal (e. g., Na, K) salts.

The term "meat" as employed throughout the specification and claims has its conventional meaning, namely, the flesh of animals used as food.

Having thus described the invention, what we claim as new and desire to secure by Letters Patent of the United States is:

1. A method of enhancing the keeping qualities of meat which comprises treating meat with a non-toxic, water soluble diacetate salt containing combined but undissociated acetic acid, said salt being employed in bacteria and mold inhibiting quantities.

2. A method of retarding the growth and development of bacteria in meat which comprises treating meat with bacteria inhibiting quantities of a non-toxic, water soluble diacetate salt containing combined but undissociated acetic acid.

3. A method of retarding the growth of bacteria in meat which comprises treating meat with sodium diacetate in bacteria inhibiting quantities.

4. A method of retarding the growth of mold in meat which comprises treating meat with sodium diacetate in mold inhibiting quantities.

5. A method of retarding the growth and development of bacteria and mold on the casings of encased meat products including sausages which comprises coating the casings of such products with a coating composition comprising a non-toxic, water soluble acetate salt containing combined but undissociated acetic acid in bacteria and mold inhibiting quantities.

6. A method of retarding the growth and development of bacteria and mold on the casings of encased meat products which comprises applying to the casings of such products a gelatinous medium capable of adhering thereto, said gelatinous medium containing bacteria and mold inhibiting quantities of an alkali diacetate.

7. In the preparation of meat products containing a meat surrounded by a solidified gel medium, the step which comprises incorporating into said gel medium bacteria and mold inhibiting quantities of an alkali diacetate.

8. In the preparation of meat products containing a binder, the step which comprises incorporating into said binder bacteria and mold inhibiting quantities of an alkali diacetate.

9. A meat binder containing about 1% to about 35% of a non-toxic, water soluble acetate salt containing combined but undissociated acetic acid, said binder being adapted to be incorporated with meat in making meat products in amounts up to about 3½% by weight of the meat product.

10. A meat containing about .1% to about 1.5% of an alkali diacetate.

11. A meat containing about .1% to about 1.5% of sodium diacetate.

12. A composition comprising a meat binder and a non-toxic, water soluble, acetate salt containing combined but undissociated acetic acid.

13. A method of enhancing the keeping qualities of meat which comprises treating meat with a non-toxic water soluble acetate salt containing combined but undissociated acetic acid, said salt being employed in bacteria and mold inhibiting quantities.

14. A meat containing bacteria and mold inhibiting quantities of a non-toxic water soluble acetate salt containing combined but undissociated acetic acid.

HANS F. BAUER.
ELMER F. GLABE.

REFERENCES CITED

The following references are of record in the file of this patent:

UNITED STATES PATENTS

| Number | Name | Date |
|---|---|---|
| 213,826 | Libby | Apr. 1, 1879 |
| 125,102 | Vasquez | Mar. 26, 1872 |
| 2,060,160 | Allen | Nov. 10, 1936 |
| 1,311,709 | Plaisance | July 29, 1919 |
| 2,022,139 | Meder | Nov. 26, 1935 |
| 128,320 | Mosquera | June 25, 1872 |

FOREIGN PATENTS

| Number | Country | Date |
|---|---|---|
| 152,946 | British | Oct. 5, 1920 |
| 835 | British | Mar. 19, 1872 |
| 308,405 | British | Mar. 28, 1929 |

OTHER REFERENCES

Bach, D., "Etudes sur les antiseptiques" from Bull. sc. Pharm., 39, 1932, page 431.

Kirby, Frey and Atkin, "The Growth of Bread Molds as Influenced by Acidity," Cereal Chemistry, vol. 12, No. 3, May 1935, page 251.

Kirby, Atkin and Frey, "Further Studies on the Growth of Bread Molds as Influenced by Acidity," Cereal Chemistry, vol. 14, No. 6, Nov. 1937, page 878.

Seidell, "Solubilities of Inorganic and Organic Compounds," ed. 2, vol. 1, page 626.

Gamelin-Kraut "Handbuch der Anorganischen Chemie," Band II, abteilung 1, page 453. Published by Winter Heidelberg 1906.